US008964666B2

(12) United States Patent
Marinier et al.

(10) Patent No.: US 8,964,666 B2
(45) Date of Patent: *Feb. 24, 2015

(54) METHOD FOR CONTROLLING THE DATA RATE OF A CIRCUIT SWITCHED VOICE APPLICATION IN AN EVOLVED WIRELESS SYSTEM

(75) Inventors: Paul Marinier, Brossard (CA); Diana Pani, Montreal (CA); Christopher R. Cave, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 84 days.

This patent is subject to a terminal disclaimer.

(21) Appl. No.: 13/470,970

(22) Filed: May 14, 2012

(65) Prior Publication Data

US 2012/0224548 A1    Sep. 6, 2012

Related U.S. Application Data

(63) Continuation of application No. 12/346,086, filed on Dec. 30, 2008, now Pat. No. 8,179,839.

(60) Provisional application No. 61/019,156, filed on Jan. 4, 2008.

(51) Int. Cl.
    *G08C 17/00*    (2006.01)
    *H04W 4/00*     (2009.01)
    *H04L 1/18*     (2006.01)
    (Continued)

(52) U.S. Cl.
    CPC ............ *H04L 1/1812* (2013.01); *H04L 1/0002* (2013.01); *H04L 1/0014* (2013.01); *H04W 72/042* (2013.01); *Y02B 60/31* (2013.01)
    USPC .......................................... 370/329; 370/311

(58) Field of Classification Search
    None
    See application file for complete search history.

(56) References Cited

U.S. PATENT DOCUMENTS

| 8,300,542 | B2 | 10/2012 | Peisa et al. |
| 2004/0160979 | A1 | 8/2004 | Pepin et al. |
| 2004/0247993 | A1* | 12/2004 | Johnson et al. ................ 429/50 |

(Continued)

FOREIGN PATENT DOCUMENTS

| CN | 101014159 | 8/2007 |
| WO | WO 03/019961 | 3/2003 |

(Continued)

OTHER PUBLICATIONS

Arjona et al., "Towards High Quality VoIP in 3G Networks—An Empirical Study," Fourth Advanced International Conference on Telecommunications, pp. 143-150 (Jun. 8, 2008).

(Continued)

*Primary Examiner* — Jutai Kao
(74) *Attorney, Agent, or Firm* — Volpe and Koenig, P.C.

(57) ABSTRACT

An apparatus and method of transmitting a circuit switched (CS) voice application via an enhanced dedicated channel (E-DCH), implemented in a wireless transmit/receive unit (WTRU). The method includes receiving a grant; performing an E-TFC selection procedure based on the grant, wherein a number of bits that may be transmitted over an enhanced dedicated channel (E-DCH) is determined, determining an adaptive multi-rate (AMR) codec bit-rate based on the number of bits that may be transmitted over the E-DCH, generating AMR voice packets based on the determined AMR codec bit rate, and submitting the AMR voice packets to lower layers for transmission over the E-DCH.

8 Claims, 6 Drawing Sheets

(51) Int. Cl.
  *H04L 1/00* (2006.01)
  *H04W 72/04* (2009.01)

(56) References Cited

U.S. PATENT DOCUMENTS

| | | | |
|---|---|---|---|
| 2005/0099961 A1 | 5/2005 | Holma | |
| 2006/0268821 A1* | 11/2006 | Terry | 370/349 |
| 2007/0297360 A1* | 12/2007 | Joachim et al. | 370/329 |
| 2008/0144568 A1* | 6/2008 | Usuda et al. | 370/329 |
| 2010/0128742 A1* | 5/2010 | Chun et al. | 370/474 |
| 2010/0220717 A1* | 9/2010 | Kim et al. | 370/352 |

FOREIGN PATENT DOCUMENTS

| | | |
|---|---|---|
| WO | WO 2007/091941 | 8/2007 |
| WO | WO 2007/121163 | 10/2007 |

OTHER PUBLICATIONS

Huawei, "Rate Control for CS Over HSPA", 3Gpp TSG-RAN WG2 #60, R2-074932, (Jeju, Korea, Nov. 5-9, 2007).

IPWireless, "Clarification of 3GPP Procedures", 3GPP TSG RAN#37, Tdoc RP-070675, (Riga, Latvia, Sep. 11-14, 2007).

Third Generation Partnership Project Support Team, "Draft1, Minutes of the 60th TSG-RAN WG2 Meeting (Jeju, Korea)", TSG-RAN WG2 meeting #60 bis, R2-07080510, (Seville, Spain, Jan. 14-18, 2008).

Third Generation Partnership Project, "Technical Specification Group Radio Access Network; FDD enhanced Uplink; Overall Description; Stage 2 (Release 6)", 3GPP TS 25.309 V6.6.0 (Mar. 2006).

Third Generation Partnership Project, "Technical Specification Group Services and System Aspects, Mandatory Speech Codec Speech Processing Functions; Adaptive Multi-Rate (AMR) Speech Codec; Transcoding Functions (Release 6)", 3GPP TS 26.090 V6.0.0 (Dec. 2004).

Third Generation Partnership Project, "Technical Specification Group Services and System Aspects, Mandatory Speech Codec Speech Processing Functions; Adaptive Multi-Rate (AMR) Speech Codec; Transcoding Functions (Release 6)", 3GPP TS 26.090 V7.0.0 (Jun. 2007).

Third Generation Partnership Project, "Technical Specification Group Services and System Aspects, Mandatory Speech Codec Speech Processing Functions; Adaptive Multi-Rate (AMR) Speech Codec; Transcoding Functions (Release 6)", 3GPP TS 26.090 V8.0.0 (Dec. 2008).

Third Generation Partnership Project, "Technical Specification Group Radio Access Network; Medium Access Control (MAC) Protocol Specification (Release 7)," 3GPP TS 25.321 v7.6.0 (Sep. 2007).

Third Generation Partnership Project, "Technical Specification Group Radio Access Network; Medium Access Control (MAC) Protocol Specification (Release 7)," 3GPP TS 25.321 v7.10.0 (Sep. 2008).

Third Generation Partnership Project, "Technical Specification Group Radio Access Network; Medium Access Control (MAC) Protocol Specification (Release 8)," 3GPP TS 25.321 v8.3.0 (Sep. 2008).

* cited by examiner

METHOD FOR CONTROLLING THE DATA RATE OF A CIRCUIT SWITCHED VOICE APPLICATION IN AN EVOLVED WIRELESS SYSTEM

CROSS REFERENCE TO RELATED APPLICATIONS

This application is a continuation of U.S. patent application Ser. No. 12/346,086 filed Dec. 30, 2008, which claims the benefit of U.S. Provisional Application No. 61/019,156 filed Jan. 4, 2008. Each of the above-referenced applications is incorporated by reference as if fully set forth.

FIELD OF INVENTION

This application is related to wireless communications.

BACKGROUND

The Third Generation Partnership Project (3GPP) Release 99 introduced carrying circuit-switched (CS) voice over a dedicated transport channel (DCH) on both the uplink (UL) and downlink (DL) in order to control the adaptive multi-rate (AMR) data rate. AMR is an audio data compression scheme optimized for voice coding.

AMR coding is used to select the optimum channel (half or full rate) and codec mode (voice and channel bit rates) to deliver the best combination of voice quality and system capacity. AMR coding improves the quality and robustness of the network connection while sacrificing some voice clarity. The AMR codec has the capability of generating voice frames containing a variable number of bits according to a set of possible data rates. The selection of a higher data rate results in a higher voice quality at the expense of requiring more resources to transmit the data.

FIG. 1 is a block diagram of an AMR voice system 100. The AMR system may include a transmit side 110 and a receive side 120. The transmit side 110 may comprise a 8-bit A law or µ-law pulse code modulator, a low pass filter, an analog-to-digital converter, a voice activity detector, a voice encoder, a comfort noise generation system, and an error concealment mechanism to combat the effects of transmission errors and lost packets. The receive side 120 may comprise components for the inverse functions.

As shown in FIG. 1, the voice encoder takes its input as a 13 bit uniform Pulse Code Modulated (PCM) signal either from the audio part of the WTRU or on the network side, from the Public Switched Telephone Network (PSTN) via an 8-bit A-law or µ-law to 13-bit uniform PCM conversion. The encoded voice at the output of the voice encoder is packetized and delivered to a discontinuous transmission control and operation block (i.e. network interface). In the receive side 120, the inverse operations take place.

The detailed mapping between input blocks of 160 voice samples in 13 bit uniform PCM format to encoded blocks (in which the number of bits depends on the presently used codec mode) and from these to output blocks of 160 reconstructed voice samples is described in 3GPP TS 26.090. The encoding scheme is Multi-Rate Algebraic Code Excited Linear Prediction. The bit-rates of the source codec are listed in Table 1.

The multi-rate voice encoder is a single integrated voice codec with eight source rates from 4.75 Kbit/s to 12.2 Kbit/s, and a low rate background noise encoding mode. The voice coder is capable of switching its bit-rate every 20 ms voice frame upon command. An AMR voice codec capable WTRU supports the following source codec bit-rates listed in Table 1.

TABLE 1

Source codec bit-rates for the AMR codec.

| Codec mode | Source codec bit-rate |
|---|---|
| AMR__12.20 | 12.20 Kbit/s (GSM EFR) |
| AMR__10.20 | 10.20 Kbit/s |
| AMR__7.95 | 7.95 Kbit/s |
| AMR__7.40 | 7.40 Kbit/s (IS-641) |
| AMR__6.70 | 6.70 Kbit/s (PDC-EFR) |
| AMR__5.90 | 5.90 Kbit/s |
| AMR__5.15 | 5.15 Kbit/s |
| AMR__4.75 | 4.75 Kbit/s |
| AMR__SID | 1.80 Kbit/s (see note 1) |

In a 3GPP Release 99 system, when CS voice is carried over the DCH, the AMR data rate on the UL may be controlled using transport format combination (TFC) control messages transmitted by a radio network controller (RNC). The network may alleviate UL congestion by reducing the data rate of a WTRU utilizing CS voice transmission.

3GPP Release 6 introduced high-speed uplink packet access (HSUPA) to provide higher data rates for uplink transmissions. As part of HSUPA, a new transport channel, the enhanced dedicated channel (E-DCH) was introduced. The E-DCH is a transport uplink channel that is used to improve capacity, data throughput, and reduce the delays for the dedicated channels in the UL. Typically in each transmission time interval (TTI), one transport block of data may be transmitted. The size of the transport block may very for each TTI.

In HSUPA, the MAC layer may multiplex data from multiple logical channels or MAC-d flows to a single E-DCH. The network may configure which MAC-d flows may be multiplexed together and the highest priority MAC-d flow being transmitted dictates the quality of service (QoS) parameterization of a transmission. A MAC-d flow may be defined as a flow of MAC-d PDUs which belong to logical channels that share some QoS characteristics.

Support for the transport of CS voice over the High-Speed Downlink Shared Channel (HS-DSCH) and the E-DCH has been introduced in Releases 7 and 8. This feature has several benefits, such as minimizing the use of DCH transport channel in a cell and faster call setup.

Currently, there is no method describing how to control the UL data rate of a CS voice service when it is carried over the E-DCH. There exists a need to implement the rate control of a CS voice carried over the E-DCH.

In a 3GPP Release 6 system, the E-DCH uses different scheduling mechanisms and a hybrid automatic repeat request (HARQ). The scheduling is typically based on scheduling grants sent by a Node-B scheduler to control the WTRU's uplink transmissions. The WTRU may transmit scheduling information to request additional resources. Scheduling grants may include absolute grants and relative grants. Absolute grants set an absolute value of an upper limit of the power a terminal may use for a transmission. Relative grants meanwhile update the resource allocation by indicating a value such as "up", "down", or "hold". However, a clear mapping between transport formats and supportable data rates does not exist. Further, the resource allocation tasks of the E-DCH are shared between the RNC and the Node-B. Additionally, a WTRU may need to reduce its UL data rate due to transmission power limitations at a cell edge.

Accordingly, there exists a need to control the AMR data rate when CS voice service is transmitted over the E-DCH. By controlling the AMR data rate when CS voice is transmitted over the E-DCH, the UL voice coverage may be extended.

SUMMARY

An apparatus and method of transmitting a circuit switched (CS) voice application via an enhanced dedicated channel (E-DCH), implemented in a wireless transmit/receive unit (WTRU) are disclosed. The method includes receiving a grant; performing an E-TFC selection procedure based on the grant, wherein a number of bits that may be transmitted over an enhanced dedicated channel (E-DCH) is determined, determining an adaptive multi-rate (AMR) codec bit-rate based on the number of bits that may be transmitted over the E-DCH, generating AMR voice packets based on the determined AMR codec bit rate, and submitting the AMR voice packets to lower layers for transmission over the E-DCH.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
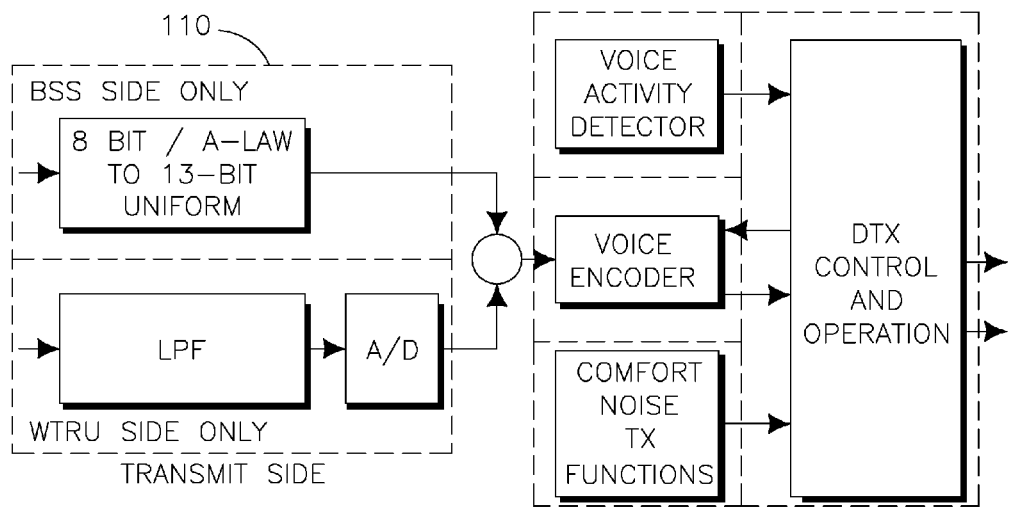
FIG. 1 is a block diagram of an AMR voice system 100.
Figure 1:
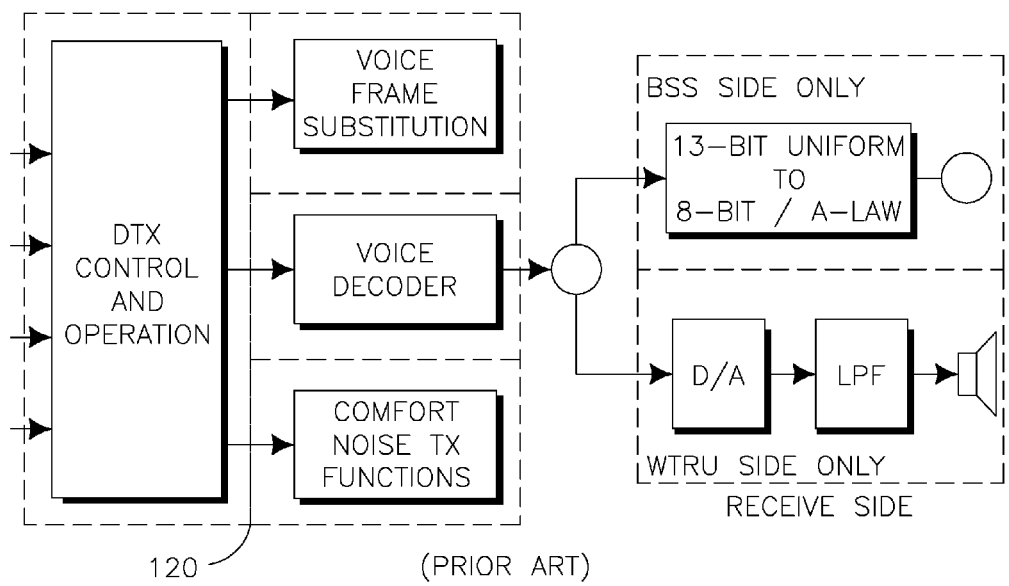
Figure 2:
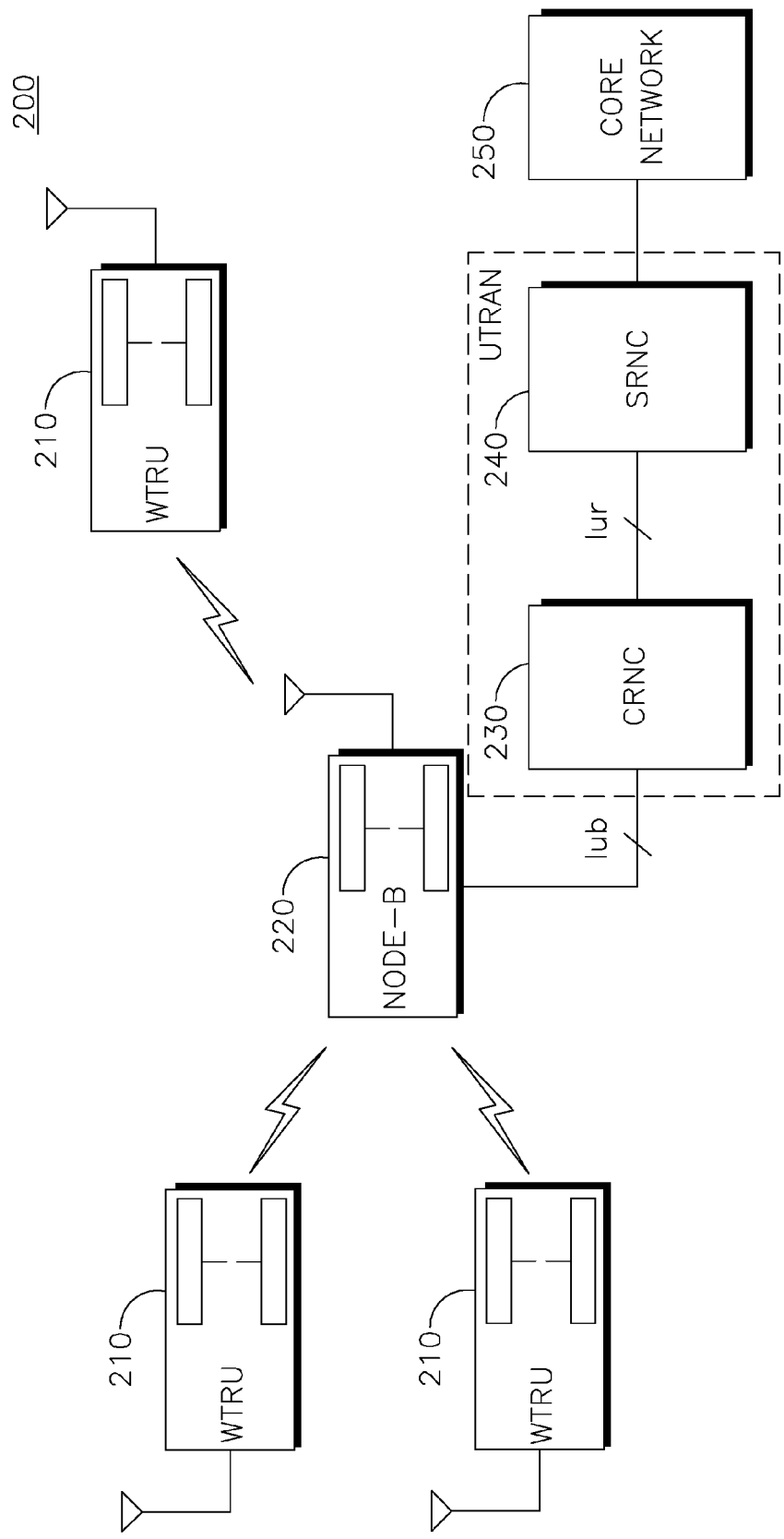
FIG. 2 shows a wireless communication system.

FIG. 2 shows a wireless communication system 200 including a plurality of WTRUs 210, a Node-B 220, a controlling radio network controller (CRNC) 230, a serving radio network controller (SRNC) 240, and a core network 250.

As shown in FIG. 2, the WTRUs 210 are in communication with the Node-B 220, which is in communication with the CRNC 230 and the SRNC 240. Although three WTRUs 210, one Node-B 220, one CRNC 230, and one SRNC 240 are shown in FIG. 2, it should be noted that any combination of wireless and wired devices may be included in the wireless communication system 200.

Figure 3:
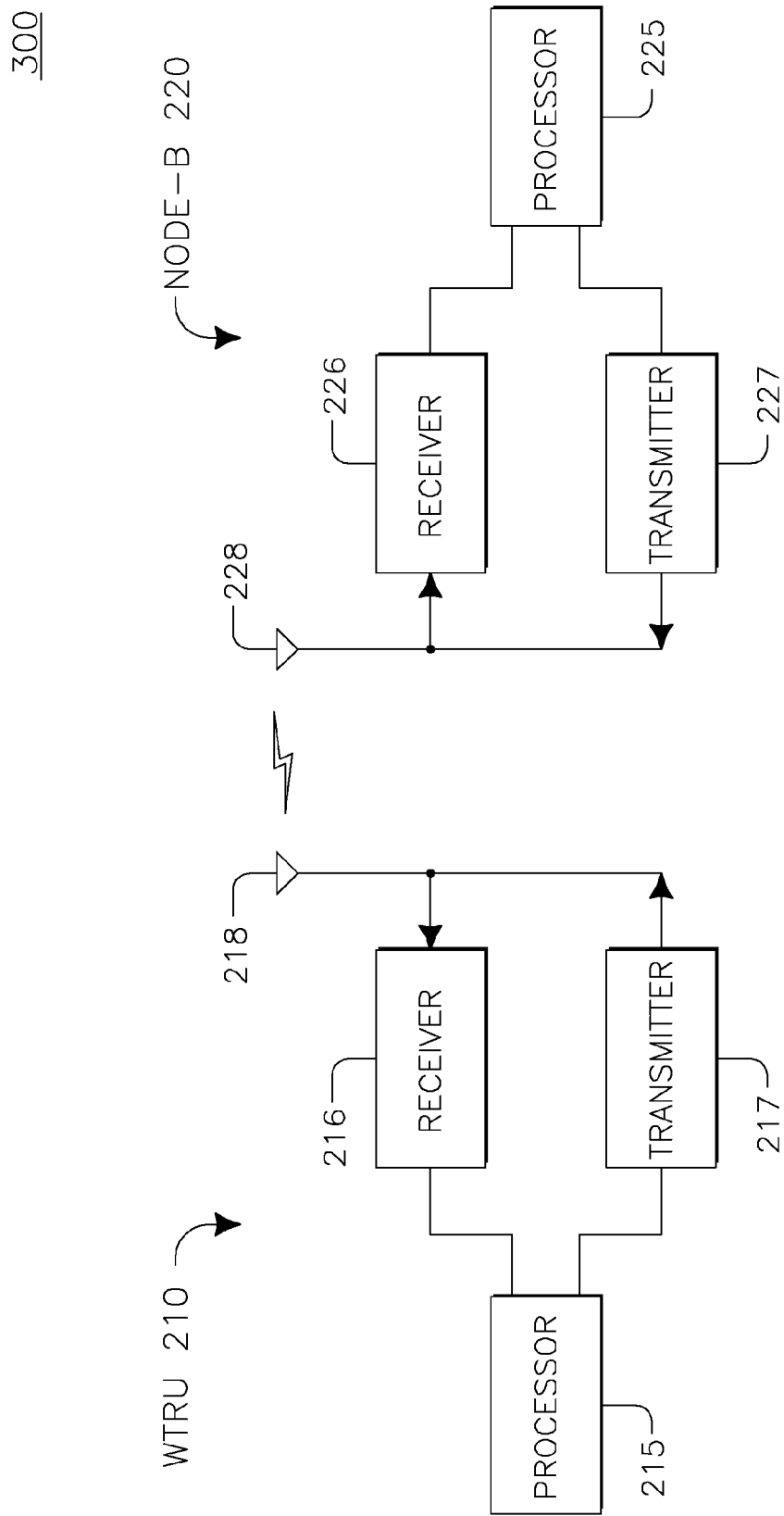
FIG. 3 is a functional block diagram of a wireless transmit/receive unit (WTRU) and the base station of the wireless communication system shown in FIG. 2.

FIG. 3 is a functional block diagram 300 of a WTRU 210 and the Node-B 220 of the wireless communication system 200 of FIG. 2. As shown in FIG. 3, the WTRU 210 is in communication with the Node-B 220 and both are configured to perform a method for controlling the data rate of a CS voice application in an evolved wireless system.

In addition to the components that may be found in a typical WTRU, the WTRU 210 includes a processor 215, a receiver 216, a transmitter 217, and an antenna 218. The processor 215 is configured to perform a method for controlling the data rate of a CS voice application. The receiver 216 and the transmitter 217 are in communication with the processor 215. The antenna 218 is in communication with both the receiver 216 and the transmitter 217 to facilitate the transmission and reception of wireless data.

In addition to the components that may be found in a typical base station, the Node-B 220 includes a processor 225, a receiver 226, a transmitter 227, and an antenna 228. The processor 225 is configured to perform a method for controlling the data rate of a CS voice application. The receiver 226 and the transmitter 227 are in communication with the processor 225. The antenna 228 is in communication with both the receiver 226 and the transmitter 227 to facilitate the transmission and reception of wireless data.

In a first embodiment, a MAC-d flow containing the CS voice data is a non-scheduled MAC-d flow. For a non-scheduled MAC-d flow, the SRNC 240 may be configured to signal a guaranteed physical layer data rate for a specific MAC-d flow or a specific service. The non-scheduled MAC-d flow may effectively disable a Node-B 220 scheduler control for this particular service. The SRNC 240 may be configured to determine a maximum number of bits from the MAC-d flow that may be transmitted in an E-DCH transport block. The serving Node-B 220 may be configured to restrict the non-scheduled MAC-d flow to be transmitted on specific HARQ processes and to inform the SRNC 240 of the restriction. For a non-scheduled flow, either direct mapping or indirect mapping may be implemented.

Figure 4:
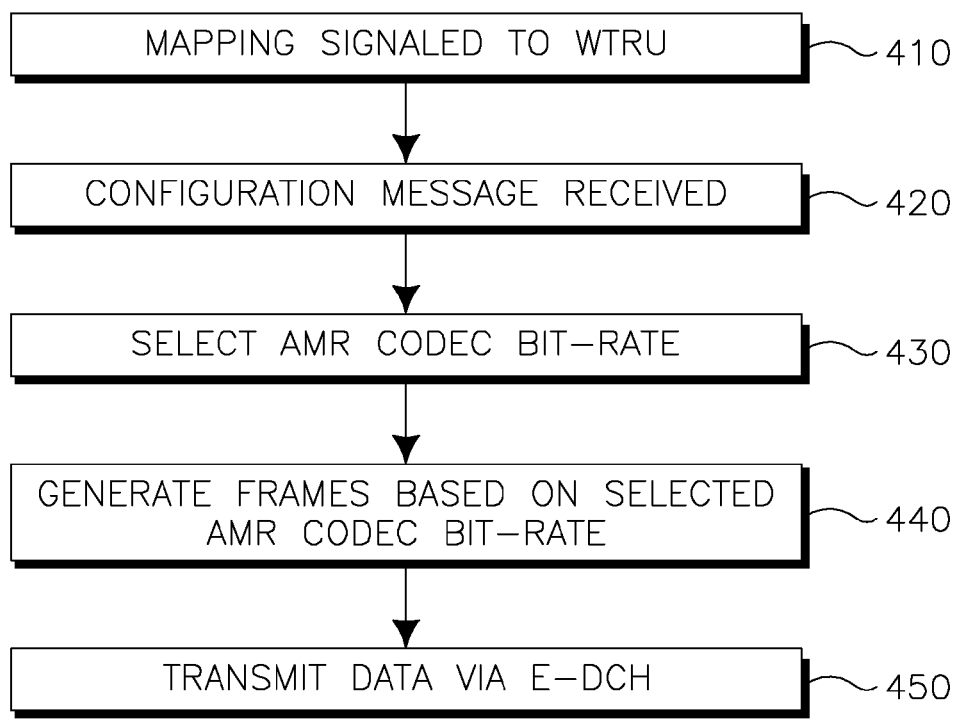
FIG. 4 is a flow diagram of a direct mapping implemented in a non-scheduled MAC-d flow.

FIG. 4 is a flow diagram 400 of a direct mapping implemented in a non-scheduled MAC-d flow. The SRNC 240 may be configured to control the data rate of a CS voice application when there is a direct mapping between the number of bits for a transmission and an AMR codec bit-rate. A mapping identifying an AMR codec bit-rate for UL transmissions based on a number of bits allowed during UL transmissions may be signaled to the WTRU (410). Alternatively the WTRU 210 may be preconfigured with the mapping. For example, a non-scheduled flow of 204+x bits, where x is the number of header bits due to the Packet Data Convergence Protocol (PDCP) radio link control (RLC) and MAC headers, may be mapped to a single AMR frame of 204 bits, or a non-scheduled flow of 408+x bits may be mapped to two AMR frames of 204 bits. The WTRU 210 may receive a configuration (or reconfiguration) message (420) from the SRNC 240. The configuration message may comprise information identifying a maximum number of bits allowed for non-scheduled UL transmissions. In response to receiving the configuration message from the SRNC 240, the WTRU 210 may then select the proper AMR codec bit-rate (430). The selected AMR codec bit-rate may be used to generate frames that map to the new maximum number of bits (440). The WTRU 210 then transmits the generated frames via the E-DCH (450). This direct mapping method allows for a method of controlling the AMR codec bit-rate of the WTRU 210 from the SRNC 240.

The WTRU 210 may be configured to autonomously determine the AMR codec bit-rate based on the maximum number of bits indicated by the SRNC 240 signaling (i.e. configuration message). For example, the WTRU 210 may receive the configuration message indicating the maximum number of bits for a non-scheduled UL transmission. The WTRU 210 may be configured to determine an AMR frame type, (when multiplied by the number of frames per transmission), that has the largest total number of bits (including required PDCP/RLC/MAC overhead) smaller than or equal to the maximum number of bits of the non-scheduled transmissions. Optionally, the Node-B 220 may signal to the WTRU 210 the number of AMR frames that should be mapped to the non-scheduled transmission in order to avoid any ambiguity.

The direct mapping method may also allow for adaptation of the AMR codec bit-rate in case the WTRU 210 data rate is limited by the WTRU's 210 transmission power. In this case, the number of bits available for transmission for the non-scheduled MAC-d flow is less than the maximum number of bits signaled by the SRNC 240 because the transmission power of the WTRU 210 is insufficient to transmit this maximum number of bits. This may occur as a WTRU 210 moves to a cell edge. In this case, the WTRU 210 becomes more power limited. Accordingly, in order to maintain a voice connection the WTRU 210 may adjust the codec bit-rate of the AMR codec to maintain transmission of voice data at a lower data rate, even though available power may be reduced.

Figure 5:
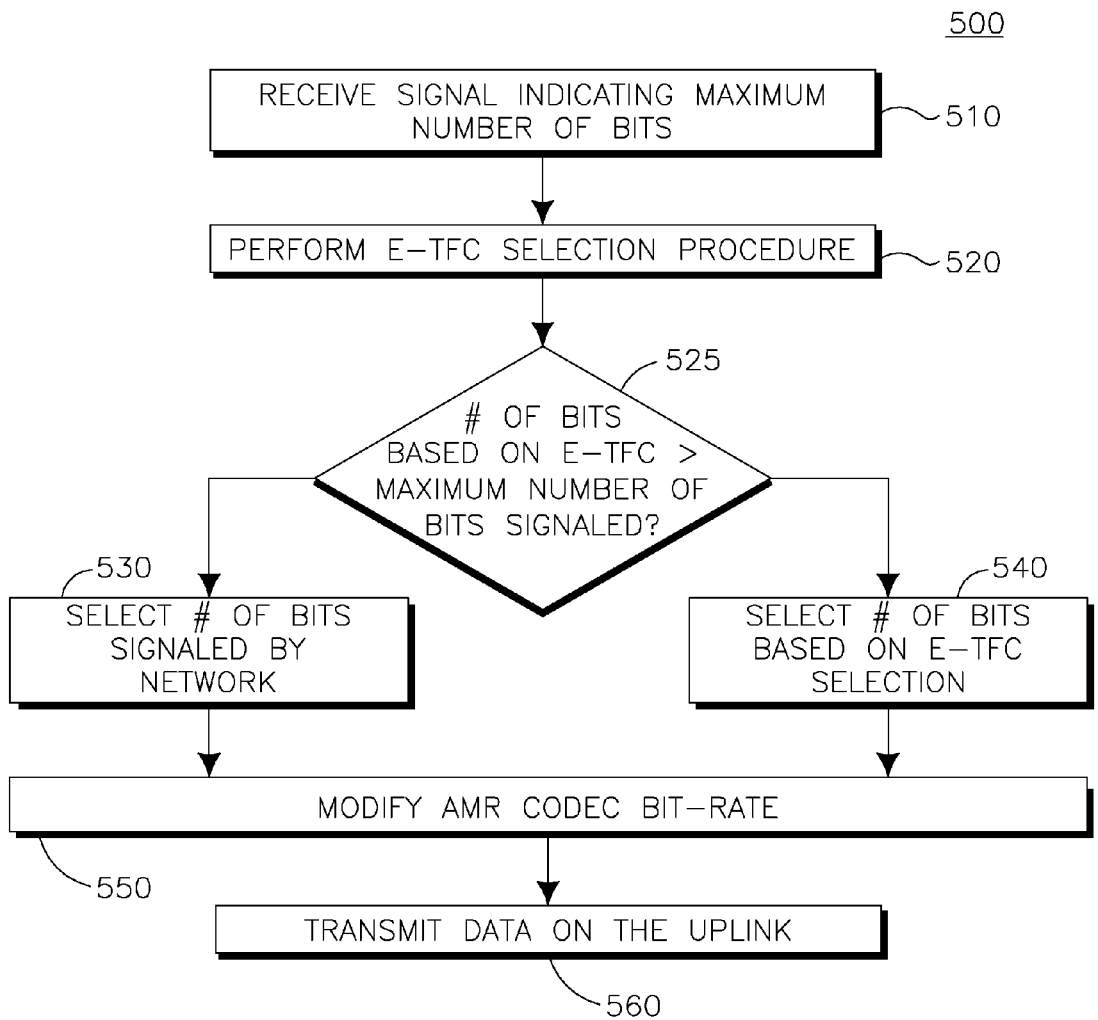
FIG. 5 shows a flow diagram of an autonomous selection of an AMR codec-bit rate when the WTRU data rate is limited by the WTRU's transmission power.

FIG. 5 shows a flow diagram 500 of an autonomous selection of an AMR codec-bit rate when the WTRU 210 data rate is limited by the WTRU's 210 transmission power. The WTRU 210 receives a signal indicating the maximum number of bits that may be used for UL transmissions (510). The WTRU 210 then must determine the maximum number of bits that may be transmitted given the available power headroom. This is normally done as part of an enhanced-transport format combination (E-TFC) selection procedure (520). If this number of bits is larger or equal than the maximum number of bits signaled by the network (525), the WTRU 210 selects the available number of bits based on the received signal indicating the maximum number of bits signaled by the network (530). If the number of bits is smaller than the maximum number of bits signaled by the network(525), WTRU 210 selects the available number of bits based on the E-TFC procedure (540). After determining the number of available bits, the WTRU 210 modifies (if needed) the AMR codec bit-rate so that the AMR codec generates frames that map to a maximum number of bits, accounting for Packet Data Convergence Protocol (PDCP), Radio Link Control (RLC), and MAC-e/es header, that is smaller than the available number of bits given the restriction (550). The WTRU 210 may then transmit data in the uplink based on the modified AMR codec bit-rate (560). The WTRU 210 may be configured to reduce the AMR codec bit-rate in advance of E-TFC selection if the WTRU 210 is aware that it will soon be in a power-limited situation in order to prevent loss of AMR frames.

Additionally the WTRU 210 may be configured to reduce the AMR codec bit-rate may only if the power-limited situation persists for a predetermined time period.

In another option, indirect mapping may be implemented for the non-scheduled flow. When an indirect mapping is implemented for the non-scheduled MAC-d flow, the SRNC 240 may be configured to signal a guaranteed physical layer data rate for a specific MAC-d flow or a specific service. However, no direct mapping between the AMR codec mode and the maximum number of bits of the non-scheduled transmissions is defined. The WTRU 210 may be configured to autonomously select an AMR codec mode that results in a predefined performance level based on at least one measured metrics.

The metrics used by the WTRU 210 may include one or more of the following: the number of buffered AMR frames (in RLC and/or MAC buffers); the amount of bits in buffered AMR frames; the transmission delay of AMR frames, including either the buffering delay only or the total delay (the sum of the buffering delay and HARQ transmission delay); the number of HARQ transmissions; the HARQ block error rate (BLER); the HARQ failure rate; the number or percentage of AMR frames being discarded due to excessive buffering delay (if such discard function is configured); the WTRU transmission power; the WTRU power headroom; the available number of bits to the non-scheduled flow given the transmission power obtained from E-TFC selection procedure; the throughput of the voice transmission; maximum number of bits of the non-scheduled flow; number of available HARQ processes; maximum transmission power; target HARQ BLER (signaled by the network through new RRC signaling); or any function or combination of the above metrics.

For example, the WTRU 110 may be configured to estimate a maximum throughput. The WTRU may determine the throughput by estimating the product between the maximum number of bits, the fraction of HARQ processes available to the non-scheduled flow, and the HARQ BLER, divided by the TTI duration (2 ms).

Once the WTRU 210 collects the metrics, the WTRU 210 may be configured to use the metrics to select an AMR codec bit-rate. The WTRU 210 may select a codec bit-rate that is inferior or equal to the estimated throughput, minus a margin. In the case that the available number of bits from E-TFC selection is inferior to the maximum number of bits, that number may be used instead.

The WTRU 210 may also use MAC segmentation (if configured) to segment voice frames. Alternatively, the MAC may restrict segmentation of CS traffic over high speed packet access (HSPA).

In some cases, if segmentation is not allowed in the MAC the transmission of larger CS MAC-e or MAC-es protocol data units (PDUs) may be blocked if the selected transport block (TB) size is smaller than the CS RLC PDU. The MAC may not be able to transmit the PDU until the TB size increases. However, if subsequent CS transmissions are smaller because the AMR codec bit-rate has been reduced, this may block the transmission of the subsequent packets that may be transmitted with the given selected TB size. Therefore, the MAC entity may discard the PDU if after N TTIs it is still not able to transmit it, where N is an integer number that may be configured by higher layers or predefined in the MAC.

In a second embodiment, a MAC-d flow containing the CS voice data is a scheduled MAC-d flow. The Node-B 220 is configured to control a maximum power ratio (e.g. via a serving grant) that the WTRU 210 may use for the MAC-d flow and other MAC-d flows, which allows the Node-B 220 to impose a limit on the data rate.

Figure 6:
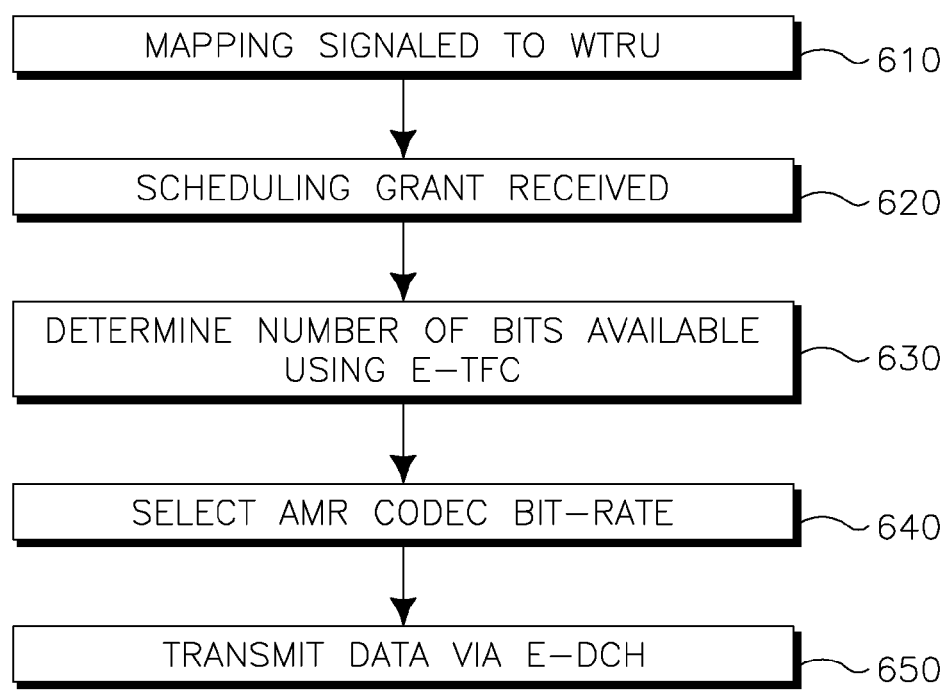
FIG. 6 is a flow diagram of a direct mapping implemented in a scheduled MAC-d flow.

FIG. 6 is a flow diagram 600 of a direct mapping implemented in a scheduled MAC-d flow. A mapping identifying an AMR codec bit-rate for UL transmissions based on a number of bits allowed during UL transmissions may be signaled to the WTRU (610). Alternatively the WTRU may be preconfigured with the mapping. The WTRU 210 may receive a scheduling grant from a Node-B (620). The grant may indicate a maximum allowable transmission power or an adjustment in the maximum allowable transmission power. The number of bits available for the scheduled transmissions may be determined using an E-TFC selection procedure (630). The number of bits available to the MAC-d flow containing the CS voice bits at transmission time may vary according to the outcome of the E-TFC selection procedure. For example, the transmission may be limited by the WTRU's 210 maximum transmission power or by the presence of data from other MAC-d flows or logical channels that must be transmitted. The WTRU 210 may then select an AMR codec bit-rate based on the number of bits available and the mapping (640). The selected AMR codec bit-rate may be used to generate frames that map to the maximum number of bits (650). The WTRU 210 then transmits the generated frames via the E-DCH. This direct mapping method may allow the Node-B 220 to dynamically control the AMR codec bit-rate of the WTRU 210.

When the MAC-d flow containing the CS voice bits is a scheduled flow, a direct mapping may be defined between the number of bits available for the scheduled transmissions and the AMR rate. Further, if desired, there may be signaling defined between the SRNC 240 and the Node-B 220 to allow the SRNC 240 to control the WTRU 210 data rate.

Optionally, once the available number of bits is known, the WTRU 210 may be configured to modify the AMR codec bit-rate to generate frames that map a number of bits (from the mapping) that is smaller than the available number of bits. Further, the WTRU 210 may be configured to reduce the AMR codec bit-rate in advance of the E-TFC selection procedure if it is determined that the available number of bits will soon be reduced in order to prevent the loss of AMR frames.

In another alternative, an indirect mapping may be implemented for the scheduled flow. When an indirect mapping is implemented for a scheduled MAC-d flow, the Node-B 220 may be configured to signal a grant. The WTRU 210 may use an E-TFC selection procedure to determine a number of bits available for uplink transmissions. However, no direct mapping between the AMR codec mode and the maximum number of bits of the scheduled transmissions is defined. The WTRU 210 may then autonomously select an AMR codec mode that results in a predefined performance level based on at least one measured metric.

The metrics used by the WTRU 210 may include one or more of the following: the number of buffered AMR frames; the amount of bits in buffered AMR frames; the transmission delay of AMR frames, including either the buffering delay only or the total delay; the number of HARQ transmissions; the HARQ BLER; the HARQ failure rate; the number or percentage of AMR frames being discarded due to excessive buffering delay; the WTRU transmission power; the WTRU power headroom; the available number of bits to the non-scheduled flow given the transmission power obtained from E-TFC selection procedure; the throughput of the voice transmission; maximum number of bits of the non-scheduled flow; number of available HARQ processes; maximum transmission power; and target HARQ BLER; or any function or combination of the above metrics.

In one embodiment, the WTRU 210 may be configured to estimate a maximum throughput. For example, the WTRU 210 may determine the throughput by estimating the product between a maximum number of bits determined after an E-TFC selection procedure, the fraction of HARQ processes available to the scheduled flow, and the HARQ BLER, divided by the TTI duration (2 ms).

Once the WTRU 210 collects the metrics, the WTRU 210 may be configured to use the metrics to select an AMR codec mode. The WTRU 210 may select a AMR codec mode that is inferior or equal to the estimated throughput, minus a margin. In the case that the available number of bits from E-TFC selection is inferior to the maximum number of bits, that number may be used instead.

The WTRU 210 may also use MAC segmentation (if configured) to segment voice frames. Alternatively, the MAC may restrict segmentation of CS traffic over high speed packet access (HSPA).

The WTRU 210 may perform the selection of an AMR codec mode according to the above every TTI, or every time the scheduled or non-scheduled grant is modified, or every time the available number of bits from E-TFC restriction changes, or every time a RLC or MAC SDU containing a voice packet has to be segmented (either at RLC or MAC layer.

In some cases, if segmentation is not allowed in the MAC, the transmission of larger CS MAC-e or MAC-es PDUs may be blocked if the selected TB size is smaller than the CS RLC PDU. The MAC may not be able to transmit the PDU until the TB size increases. However, if subsequent CS transmissions are smaller because the AMR codec bit-rate has been reduced, this may block the transmission of the subsequent packets that may be transmitted with the given selected TB size. Therefore, the MAC entity may discard the PDU if after N TTIs it is still not able to transmit it, where N is an integer number that may be configured by higher layers or predefined in the MAC.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for use in a wireless transmit/receive unit (WTRU), the method comprising:
   receiving a signal, from a Node-B, indicating an adaptive multi-rate (AMR) codec bit-rate for uplink transmissions;
   receiving a grant, from the Node-B, wherein the grant indicates a maximum allowable transmission power;
   determining a number of bits that may be transmitted over an enhanced dedicated channel (E-DCH), wherein the number of bits is determined using an enhanced-transport format combination (E-TFC) selection procedure;

determining, at the WTRU, an AMR codec bit-rate based on the received signal and the determined number of bits that are to be transmitted over the E-DCH via the E-TFC selection procedure;

reducing the AMR codec bit-rate in advance of the E-TFC selection procedure on a condition that the WTRU will be in a power-limited state within a predetermined period of time; and transmitting data at the determined AMR codec bit-rate over the E-DCH.

2. The method of claim 1, wherein the grant is a scheduled grant or a non-scheduled grant.

3. The method of claim 1 further comprising:

determining a maximum number of bits that may be transmitted over the E-DCH according to a signal, received from the Node-B, indicating a maximum number of bits that may be used for uplink transmissions, wherein the number of bits is determined using the signal, on a condition that the number of bits corresponding to the E-TFC selection procedure is greater than or equal to the number of bits indicated in the signal, or the number of bits determined using the E-TFC selection procedure, on a condition that the number of bits determined using the E-TFC selection procedure is less than the number of bits indicated in the signal, wherein the AMR code bit-rate is modified so that the WTRU transmits data over the E-DCH in accordance with the determined maximum number of bits.

4. The method of claim 1, wherein the reducing the AMR codec bit-rate is performed on a further condition that the WTRU will be in a power-limited state for at least a predetermined period of time.

5. A wireless transmit/receive unit (WTRU) comprising:

a receiver configured to receive a signal, from a Node-B, indicating an adaptive multi-rate (AMR) codec bit-rate for uplink transmissions;

the receiver is further configured to receive a grant, from the Node-B, wherein the grant indicates a maximum allowable transmission power;

a processor configured to:

determine a number of bits that may be transmitted over an enhanced dedicated channel (E-DCH), wherein the number of bits is determined using an enhanced-transport format combination (E-TFC) selection procedure;

determine an AMR codec bit-rate based on the received signal and the determined number of bits that are to be transmitted over the E-DCH via the E-TFC selection procedure;

reduce the AMR codec bit-rate in advance of the E-TFC selection procedure on a condition that the WTRU will be in a power-limited state within a predetermined period of time; and a transmitter configured to transmit data at the determined AMR codec bit-rate over the E-DCH.

6. The WTRU of claim 5, wherein the grant is a scheduled grant or a non-scheduled grant.

7. The WTRU of claim 5, wherein the processor is further configured to determine a maximum number of bits that may be transmitted over the E-DCH according to a signal, received from the Node-B, indicating a maximum number of bits that may be used for uplink transmissions, wherein the number of bits is determined using the signal, on a condition that the number of bits corresponding to the E-TFC selection procedure is greater than or equal to the number of bits indicated in the signal or the number of bits corresponding to the selected E-TFC on a condition that the number of bits determined using the E-TFC selection procedure is less than the number of bits indicated in the signal in order to determine the number of bits that may be transmitted over the E-DCH, wherein the AMR code bit-rate is modified so that the WTRU transmits data over the E-DCH in accordance with the determined maximum number of bits.

8. The WTRU of claim 5, wherein the processor is further configured to reduce the AMR codec bit-rate on a further condition that the WTRU will be in a power-limited state for at least a predetermined period of time.

* * * * *